United States Patent
Minter et al.

(10) Patent No.: US 7,316,356 B2
(45) Date of Patent: Jan. 8, 2008

(54) OPTICAL SCANNER HAVING A BALANCED MIRRORED SPINNER

(75) Inventors: Joshua B. Minter, Atlanta, GA (US); Steven J. Hammer, Lilburn, GA (US)

(73) Assignee: NCR Corporation, Dayton, OH (US)

( * ) Notice: Subject to any disclaimer, the term of this patent is extended or adjusted under 35 U.S.C. 154(b) by 197 days.

(21) Appl. No.: 11/217,718

(22) Filed: Sep. 1, 2005

(65) Prior Publication Data

US 2007/0045423 A1    Mar. 1, 2007

(51) Int. Cl.
*G02B 5/08* (2006.01)

(52) U.S. Cl. .................. 235/462.36; 235/462.38; 235/462.4; 359/221; 359/223

(58) Field of Classification Search .......... 235/462.36, 235/462.38, 462.39, 462.4; 359/221, 223
See application file for complete search history.

(56) References Cited

U.S. PATENT DOCUMENTS

| | | | | |
|---|---|---|---|---|
| 4,838,632 A * | 6/1989 | Manian | ............ | 359/221 |
| 4,941,739 A * | 7/1990 | Grudic et al. | ............ | 359/223 |
| 5,420,713 A * | 5/1995 | Kunii | ............ | 359/198 |
| 5,663,550 A * | 9/1997 | Peng | ............ | 235/462.39 |
| 5,742,420 A * | 4/1998 | Peng | ............ | 359/201 |
| 6,154,304 A * | 11/2000 | Manley | ............ | 359/212 |
| 2007/0057065 A1* | 3/2007 | Hammer et al. | ............ | 235/462.38 |

* cited by examiner

*Primary Examiner*—Steven S. Paik
(74) *Attorney, Agent, or Firm*—Paul W. Martin

(57) ABSTRACT

An optical scanner having a balanced mirrored spinner. The optical scanner includes a laser for producing a laser beam, a mirrored spinner for directing the laser beam to produce scanning light beams, and an apparatus for rotating the mirrored spinner including a motor having a shaft which rotates about a first axis of rotation, a spinner mount coupled to the shaft and having an axle coupled to the mirrored spinner for rotating the mirrored spinner about a second axis of rotation, a drive mechanism for rotating the mirrored spinner about the axle, and a balance for counteracting precession of the mirrored spinner as it rotates.

5 Claims, 6 Drawing Sheets

FIG. 6a
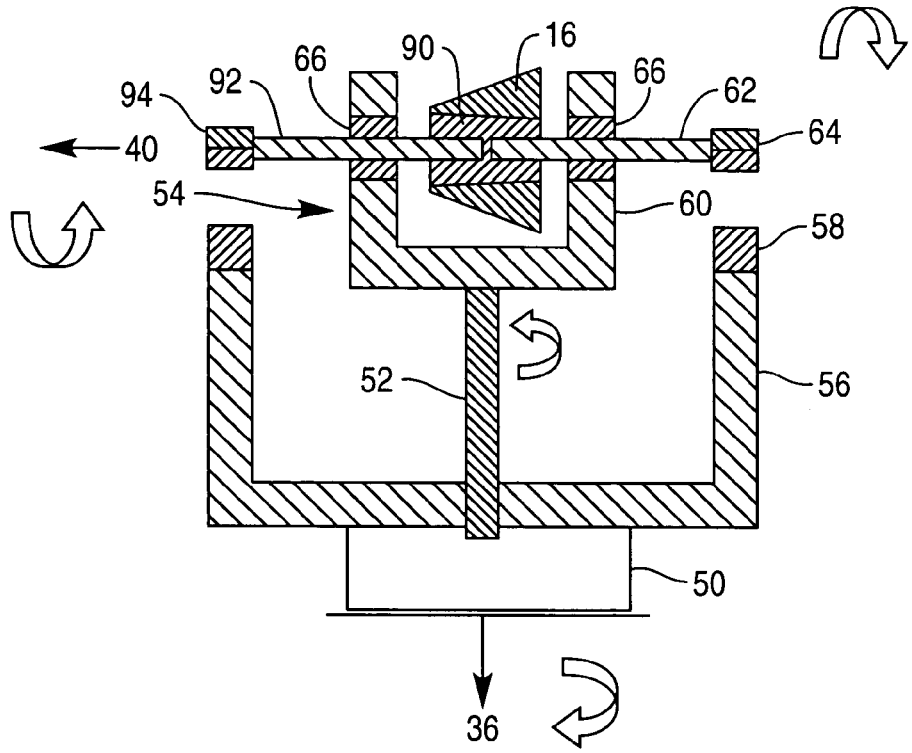
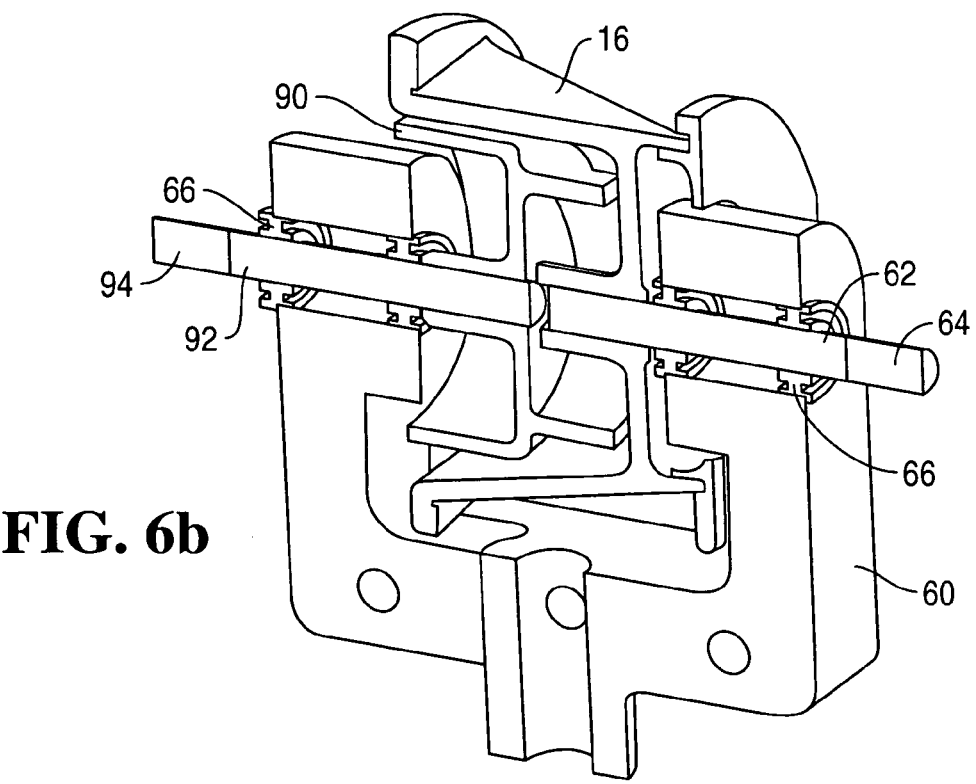
FIG. 6b

US 7,316,356 B2

OPTICAL SCANNER HAVING A BALANCED MIRRORED SPINNER

BACKGROUND

Optical bar code scanners typically include a mirrored spinner. An imbalanced spinner can cause excessive wear on bearings and an unacceptable amount of audible noise. It would be desirable to provide an optical scanner having a balanced mirrored spinner.

SUMMARY

An optical scanner having a balanced mirrored spinner is provided.

The optical scanner includes a laser for producing a laser beam, a mirrored spinner for directing the laser beam to produce scanning light beams, and an apparatus for rotating the mirrored spinner including a motor having a shaft which rotates about a first axis of rotation, a spinner mount coupled to the shaft and having an axle coupled to the mirrored spinner for rotating the mirrored spinner about a second axis of rotation, a drive mechanism for rotating the mirrored spinner about the axle, and a balance for counteracting precession of the mirrored spinner as it rotates.

BRIEF DESCRIPTION OF THE DRAWINGS

FIGS. 6a-b are views of the example scan engine illustrating a second balancing technique.

DETAILED DESCRIPTION

Figure 1:
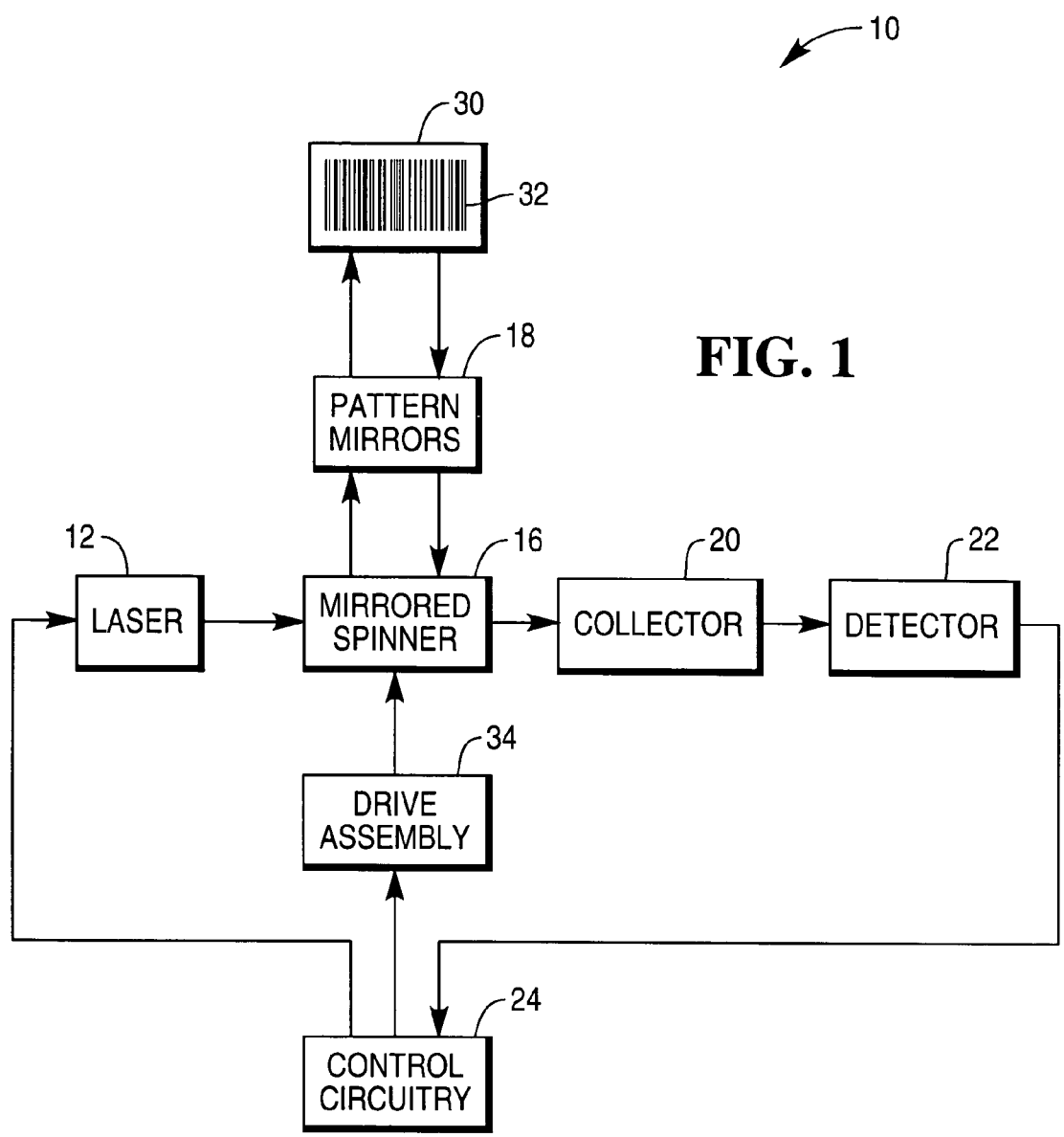
FIG. 1 is a block diagram of a bar code scanner.
Figure 2:
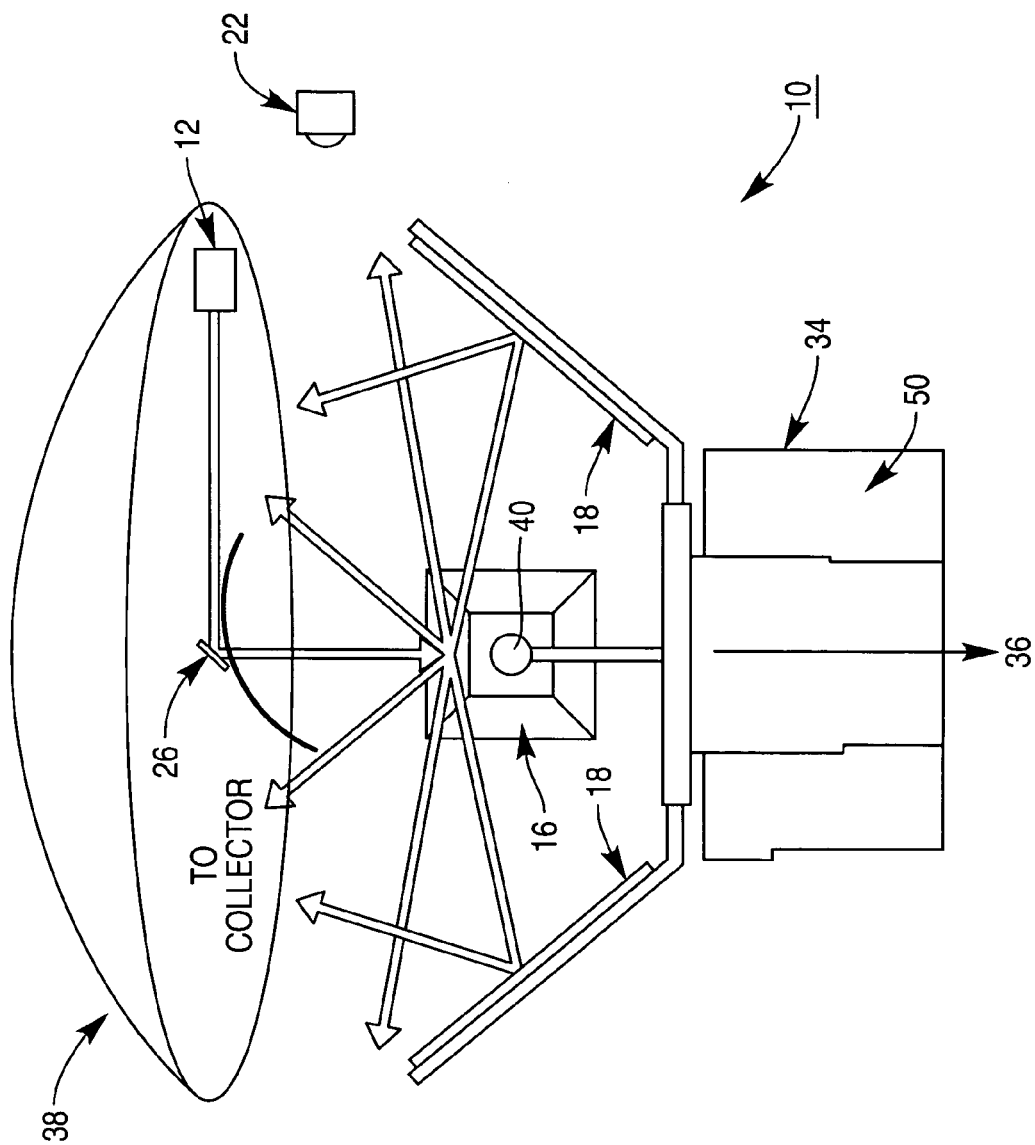
FIG. 2 is a view of an example bar code scanner.

With reference to FIGS. 1 and 2, an example bar code scanner 10 includes laser 12, mirrored spinner 16, pattern mirrors 18, collector 20, detector 22, and control circuitry 24.

Laser 12 produces a laser beam. Mirror flat 26 (FIG. 2) directs the laser beam towards mirrored spinner 16.

Mirrored spinner 16 directs the laser beam to pattern mirrors 18. Mirrored spinner 16 further directs light reflected from item 30 to collector 20. Mirrored spinner 16 is rotated by drive assembly 34. Mirrored spinner 16 is shown with may have any number of mirrored facets. Four facets are illustrated in FIG. 1.

Mirrored spinner 16 and drive assembly 34 form a scan engine having two axes 36 and 40 of rotation to essentially rotate scan volume 38 about axis 36 (FIG. 2). The scan engine produces a hemispherical shaped scan volume 38, which is larger than a comparable wedge shaped scan volume of a conventional single axis scan engine. In one embodiment, first axis 36 is substantially orthogonal to second axis 40, however, other angles between axes 36 and 40 are also envisioned.

First axis 36 is rotated by motor 50. In an example embodiment, motor rotates first axis 36 as high as about 1200 RPM. Drive assembly 34 produces an example speed of rotation about second axis 40 of as high as about 19,200 RPM (16:1 ratio). Other speeds are envisioned for various scanning applications.

Pattern mirrors 18 produce scanning light beams for scanning bar code 32 on item 30. Pattern mirrors 18 further collect light reflected from item 30 and direct the reflected light to mirrored spinner 16.

Collector 20 collects the reflected light from mirrored spinner 16.

Detector 22 converts the reflected light into electrical signals based upon the intensity of the reflected light.

Control circuitry 24 controls operation of laser 12 and motor 34 and decodes bar code information contained within the electrical signals received from detector 22.

Figure 3A:
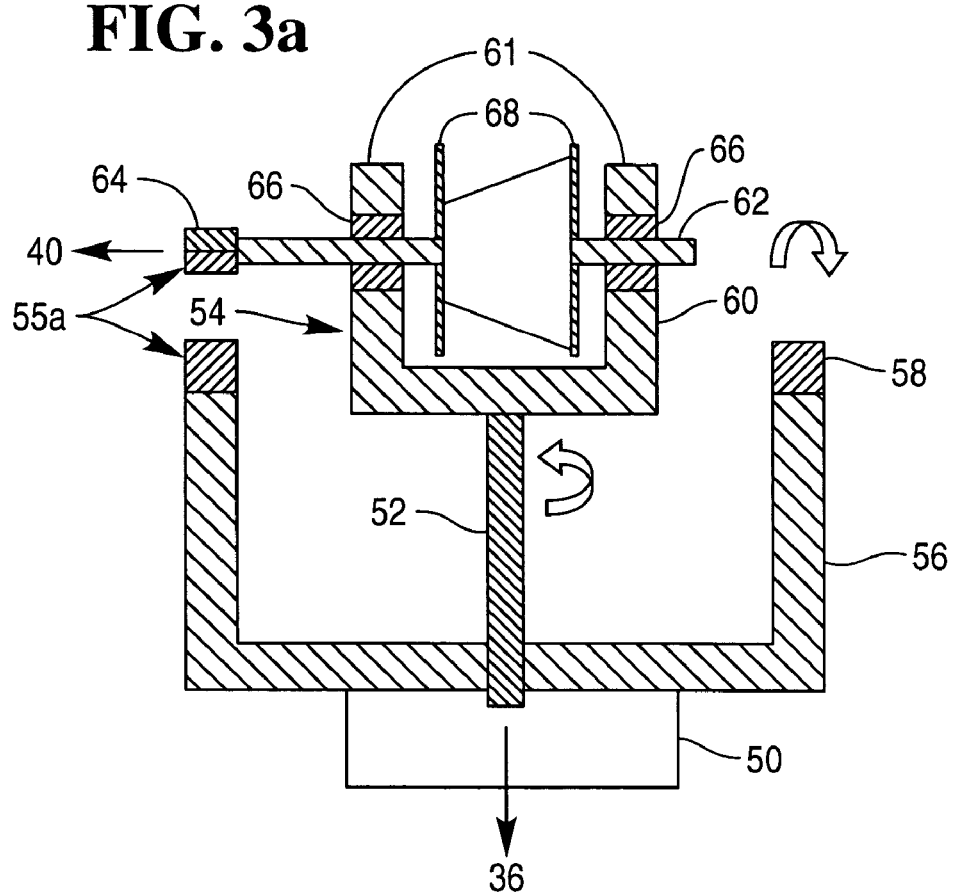
FIGS. 3a-c are views of an example scan engine.
Figure 3C:
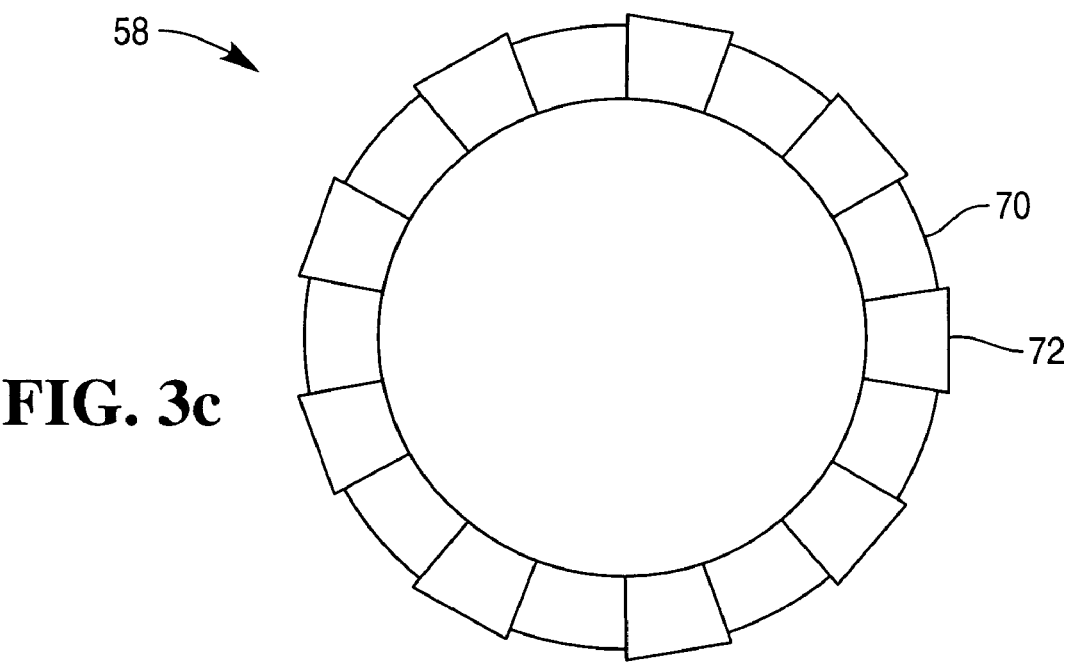
Figure 3B:
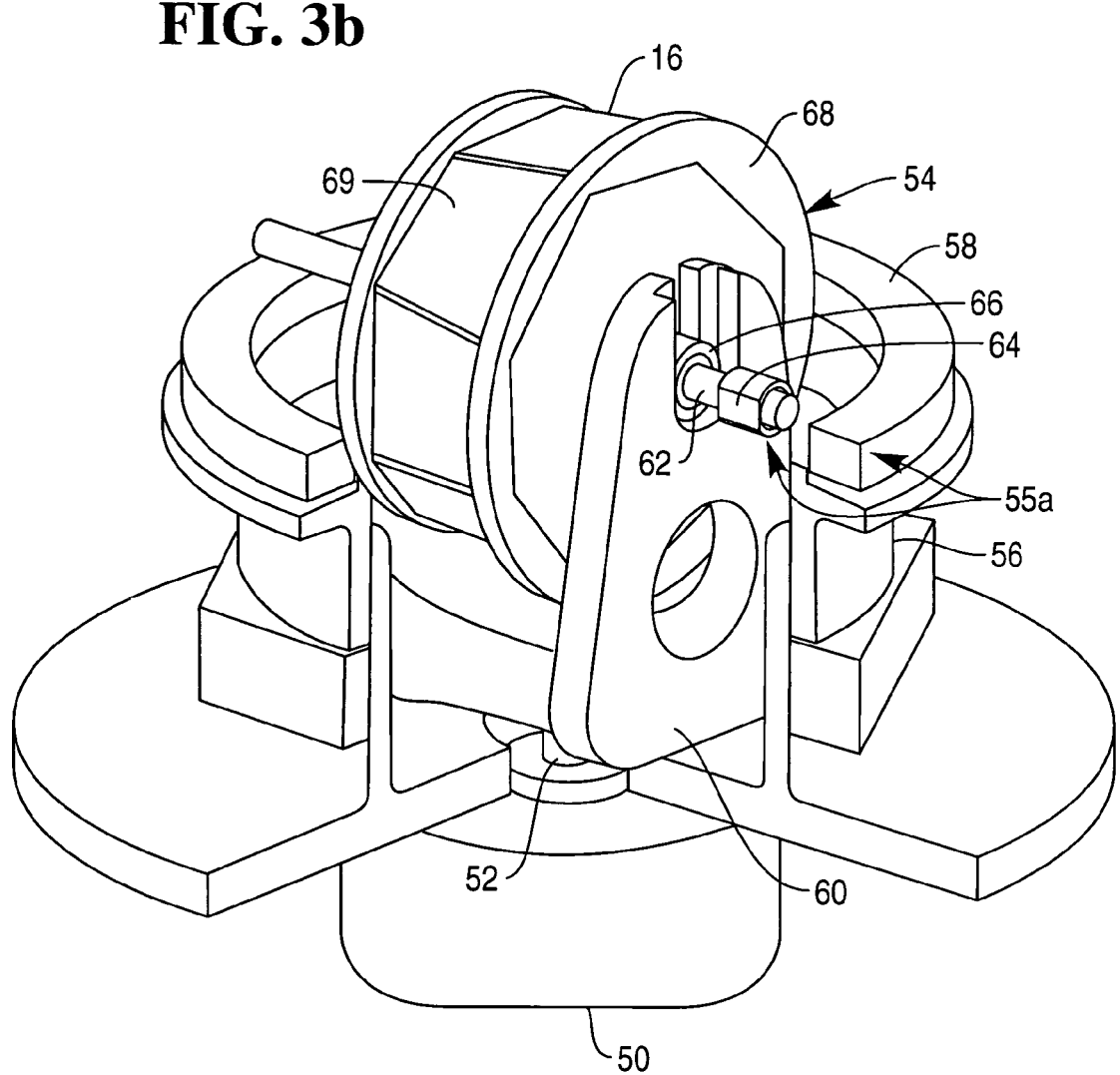

With reference to FIGS. 3a and 3b, an example embodiment of drive assembly 34 is illustrated.

With reference to FIG. 3a-c, drive assembly 34 includes motor 50, shaft 52, and spinner assembly 54.

Motor 50 is mounted in stationary fashion and rotates shaft 52.

Shaft 52 rotates spinner assembly 54 about axis 36.

Spinner assembly 54 includes yoke 60, axle 62, bearings 66, balance plates 68, and facets 69.

Yoke 60 attaches to and rotates with shaft 52. Opposite arms 61 of yoke 52 retain axle 62.

Axle 62 rotates about axis 40. Mirrored spinner 16 rotates with axle 62.

Bearings 66 are located in yoke 60. Shaft 52 rides on bearings 66.

Facets 69 are mirrored to reflect scanning light beams and reflected light. The orientations of facets 69 vary around spinner 16 so as to direct the scanning light beams in various directions. Eight facets 69 are shown in FIG. 3b.

Drive assembly further includes spinner rotation mechanism 55. In an example embodiment, spinner rotation mechanism 55 uses magnetic interaction to rotate yoke 60. Other methods for rotating spinner 16 are also envisioned, including another motor, a mechanical linkage to motor 50, and air pressure.

Thus, spinner rotation mechanism 55 includes cylinder 56, magnet 64, and ring of magnets 58.

Cylinder 56 is mounted in stationary fashion about axis 36.

Ring of magnets 58 is mounted to cylinder 56.

Magnet 64 is mounted to axle 62 and interacts with ring of magnets 58 to rotate axle 62 as yoke 60 rotates with shaft 52. In this embodiment, magnet 64 is mounted with the poles perpendicular to axle 62. Other configurations and angles are also envisioned. For example, axle 62 may be extended and another magnet 64 may be mounted to an opposite end of axle 62 from the other.

With reference to FIG. 3c, north and south magnets 70 and 72 alternate around ring of magnets 58. Other configurations of magnets 70 and 72 are also envisioned.

As motor shaft 52 rotates spinner assembly 54, attractive and repulsive forces from ring of magnets 58 act on magnet 64 on axle 62 to cause rotational torque on axle 62. In one example, ring of magnets includes nine pairs of north-south magnets 70 and 72, and each pair of north-south magnets 70 and 72 causes one revolution of axle 62, resulting in a spinner rotational speed nine times faster than the rotational speed of shaft 52.

Figure 4:
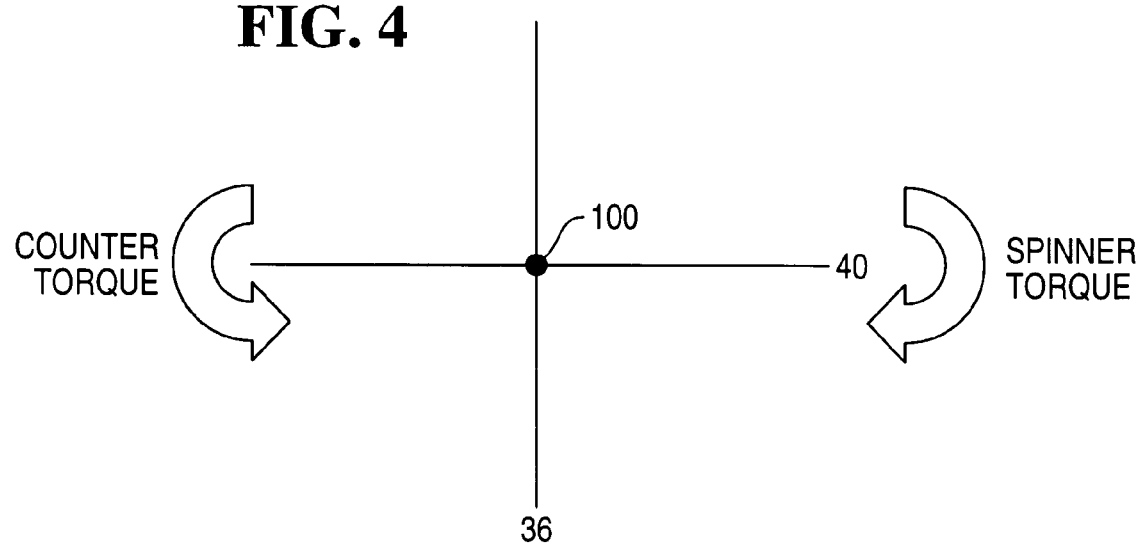
FIG. 4 is a diagrammatic view of torques produced by the example scan engine when balanced.

With reference to FIG. 4, spinner 16 has gyroscopic properties as it rotates about axis 40. Rotation of spinner assembly 54 about axis 36 causes a torque to be applied. Consequently, spinner assembly 54 counteracts this slow axis torque with a precessional torque about axis 100 that creates an imbalance in the scan engine. The imbalance results in excessive vibration, wearing of bearings 66 and an unacceptable amount of audible noise.

Figure 5:
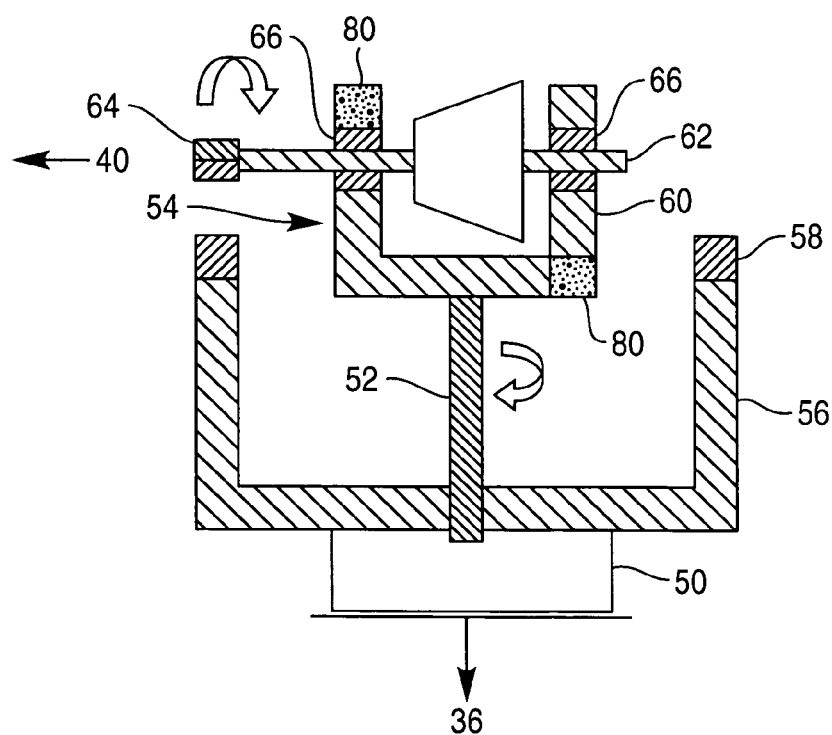
FIG. 5 is a view of the example scan engine illustrating a first balancing technique.

FIGS. 5-6 illustrate example embodiments for producing a counter torque of equal magnitude for putting the scan engine into rotational balance.

With reference to FIG. 5, counter weights 80 are added or incorporated into the design of yoke 60. Counterweights 80 are located in diagonally opposite positions in arms 61. The required counterweight mass may be added in the form of tungsten rods or balls or designed into yoke 60. Counter weights 80 are statically balanced and dynamically imbalanced.

With reference to FIGS. 6a-b, another method is to use a counter-rotating gyro 90 to produce the counter torque. A combination of inertia and angular acceleration in the correct amount produces an equal but opposite torque. Spinner 16 is hollow and gyro 90 rotates within spinner 16. One method of accomplishing this is to drive gyro 90 and spinner 16 at the same speeds but opposite directions via two separate axles 92 and 62. Axle 92 includes magnet 94 which interacts with ring of magnets 58 in a similar way as magnet 64 of axle 62. Magnet 94 rotates in a direction opposite to that of magnet 64.

Other methods of providing a counter torque are envisioned and may include applying other types of contact forces or electromagnet forces. Passive balancing techniques are inexpensive, reliable, and relatively easy to manufacture, however, other balancing techniques are also envisioned.

Although particular reference has been made to certain embodiments, variations and modifications are also envisioned within the spirit and scope of the following claims.

The invention claimed is:

1. A scanning method comprising:
   producing a laser beam;
   rotating a mirrored spinner about a first axis;
   directing the laser beam to produce scanning light beams by the mirrored spinner;
   rotating a spinner mount of the mirrored spinner about a second axis different from the first axis; and
   counteracting precession of the mirrored spinner as it rotates including incorporating a number of counter-weights into the spinner mount.

2. An optical scanner comprising:
   a laser for producing a laser beam;
   a mirrored spinner for directing the laser beam to produce scanning light beams; and
   an apparatus for rotating the mirrored spinner including
      a motor including a shaft which rotates about a first axis of rotation; and
      a spinner mount coupled to the shaft and including an axle coupled to the mirrored spinner for rotating the mirrored spinner about a second axis of rotation;
      a drive mechanism for rotating the mirrored spinner about the axle; and
      a balance for counteracting precession of the mirrored spinner as it rotates, including another axle mounted in line with the one axle in the spinner mount and a gyro located within the mirrored spinner and rotated by the other axle in a direction opposite to the one axle.

3. An optical scanner comprising:
   a laser for producing a laser beam;
   a mirrored spinner for directing the laser beam to produce scanning light beams; and
   an apparatus for rotating the mirrored spinner including
      a motor including a shaft which rotates about a first axis of rotation; and
      a spinner mount coupled to the shaft and including an axle coupled to the mirrored spinner for rotating the mirrored spinner about a second axis of rotation;
      a drive mechanism for rotating the mirrored spinner about the axle; and
      a balance for counteracting precession of the mirrored spinner as it rotates, including a number of counter-weights built into the spinner mount.

4. An optical scanner comprising:
   a laser for producing a laser beam;
   a mirrored spinner for directing the laser beam to produce scanning light beams; and
   an apparatus for rotating the mirrored spinner including
      a motor including a shaft which rotates about a first axis of rotation; and
      a spinner mount coupled to the shaft and including an axle coupled to the mirrored spinner for rotating the mirrored spinner about a second axis of rotation and a yoke with opposite arms;
      a drive mechanism for rotating the mirrored spinner about the axle; and
      a balance for counteracting precession of the mirrored spinner as it rotates, including a number of counter-weights located within the opposite arms.

5. The optical scanner of claim 4, wherein the counterweights are located in diagonally opposite positions in the opposite arms.

* * * * *